(12) United States Patent
Soda (10) Patent No.: US 11,977,308 B2
(45) Date of Patent: May 7, 2024

(54) LIQUID CRYSTAL DISPLAY DEVICE AND PORTABLE DEVICE

(71) Applicant: KYOCERA CORPORATION, Kyoto (JP)

(72) Inventor: Yuji Soda, Kusatsu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 17/787,883

(22) PCT Filed: Dec. 14, 2020

(86) PCT No.: PCT/JP2020/046610
§ 371 (c)(1),
(2) Date: Jun. 21, 2022

(87) PCT Pub. No.: WO2021/131867
PCT Pub. Date: Jul. 1, 2021

(65) Prior Publication Data
US 2023/0011659 A1 Jan. 12, 2023

(30) Foreign Application Priority Data

Dec. 23, 2019 (JP) ................... 2019-231684

(51) Int. Cl.
*G02F 1/139* (2006.01)
*G02F 1/1335* (2006.01)
(Continued)

(52) U.S. Cl.
CPC ...... *G02F 1/1393* (2013.01); *G02F 1/133531* (2021.01); *G02F 1/133553* (2013.01);
(Continued)

(58) Field of Classification Search
CPC ............. G02F 2413/05; G02F 2203/09; G02F 1/133555; G02F 2413/01; G02F 2413/08;
(Continued)

(56) References Cited

U.S. PATENT DOCUMENTS 6,204,904 B1    3/2001  Tillin et al.
2007/0182885 A1*  8/2007  Egi ................... G02F 1/133528
                                                                349/96
(Continued)

FOREIGN PATENT DOCUMENTS

JP    H10-161112 A    6/1988
JP    2006-171376 A   6/2006
(Continued)

*Primary Examiner* — Mariam Qureshi
(74) *Attorney, Agent, or Firm* — Procopio, Cory, Hargreaves & Savitch LLP (57) ABSTRACT

An electrically controlled birefringence liquid crystal display device performs a normally black display. The display device includes a liquid crystal display panel including a liquid crystal layer and a reflective portion to reflect light that is incident through a display surface of the liquid crystal display panel and that passes through the liquid crystal layer, a first polarizing plate on the display surface, and a half-wavelength plate between the liquid crystal display panel and the first polarizing plate. A phase difference $\Delta nd{-}1$ of the liquid crystal layer is less than a half of a phase difference $\Delta nd{-}2$ of the half-wavelength plate. The phase difference $\Delta nd{-}2$ of the half-wavelength plate indicates a positively dispersive wavelength, and a low axis of the half-wavelength plate intersects with an orientation axis of liquid crystal molecules in the liquid crystal layer under no electric field being applied. The liquid crystal layer has a birefringence index $\Delta n$ indicating a positively dispersive wavelength.

15 Claims, 5 Drawing Sheets

(51) Int. Cl.
*G02F 1/13363* (2006.01)
*G02F 1/137* (2006.01)

(52) U.S. Cl.
CPC .... *G02F 1/133638* (2021.01); *G02F 1/13706* (2021.01); *G02F 2203/02* (2013.01); *G02F 2203/64* (2013.01); *G02F 2413/02* (2013.01); *G02F 2413/08* (2013.01); *G02F 2413/13* (2013.01)

(58) Field of Classification Search
CPC ............ G02F 2413/02; G02F 2203/64; G02F 2203/02; G02F 1/13706; G02F 1/133638; G02F 1/133553; G02F 1/133531; G02F 1/1393
See application file for complete search history.

(56) References Cited

U.S. PATENT DOCUMENTS

| | | | |
|---|---|---|---|
| 2008/0106676 A1* | 5/2008 | Itou | G02F 1/13363 349/107 |
| 2008/0198151 A1 | 8/2008 | Lee et al. | |
| 2011/0285684 A1* | 11/2011 | Lu | G02F 1/133371 445/24 |
| 2012/0044453 A1 | 2/2012 | Miyairi et al. | |
| 2015/0248039 A1* | 9/2015 | Tamaki | G02F 1/133504 349/96 |

FOREIGN PATENT DOCUMENTS

| | | |
|---|---|---|
| JP | 2007-334147 A | 12/2007 |
| JP | 2008-197635 A | 8/2008 |
| JP | 2019-8230 A | 1/2019 |
| WO | 2010/131614 A1 | 11/2010 |

\* cited by examiner

LIQUID CRYSTAL DISPLAY DEVICE AND PORTABLE DEVICE

FIELD

The present disclosure relates to a liquid crystal display (LCD) device usable as a display for electronic devices such as mobile phones that use lower power with low-voltage driving, and to a portable device including the LCD device, such as a wearable device.

BACKGROUND

A known active matrix LCD device may have black level degradation, or specifically, its LCD panel cannot have the lowest light transmissivity during black display and cannot achieve a normally black display with high display quality. A technique for avoiding such black level degradation is awaited.

A known technique responding to this issue is described in, for example, Patent Literature 1. The known technique includes a reflective liquid crystal element including a polarizing plate, a mirror, and multiple retarders between the polarizing plate and the mirror.

CITATION LIST

Patent Literature

Patent Literature 1: Japanese Unexamined Patent Application Publication No. 10-161112

BRIEF SUMMARY

A liquid crystal display device according to one or more aspects of the present disclosure is an electrically controlled birefringence liquid crystal display device having a normally black display. The liquid crystal display device includes a liquid crystal display panel including a liquid crystal layer and a reflective portion to reflect light that is incident through a display surface of the liquid crystal display panel and that passes through the liquid crystal layer, a first polarizing plate on the display surface of the liquid crystal display panel, and a half-wavelength plate between the liquid crystal display panel and the first polarizing plate. A phase difference of the liquid crystal layer is less than a half of a phase difference of the half-wavelength plate, and has a birefringence index indicating a positively dispersive wavelength. The phase difference of the half-wavelength plate indicates a positively dispersive wavelength, and a slow axis of the half-wavelength plate intersects with an orientation axis of liquid crystal molecules in the liquid crystal layer under no electric field being applied.

BRIEF DESCRIPTION OF DRAWINGS

The objects, features, and advantages of the present disclosure will become more apparent from the following detailed description and the drawings.

DETAILED DESCRIPTION

Figure 1:
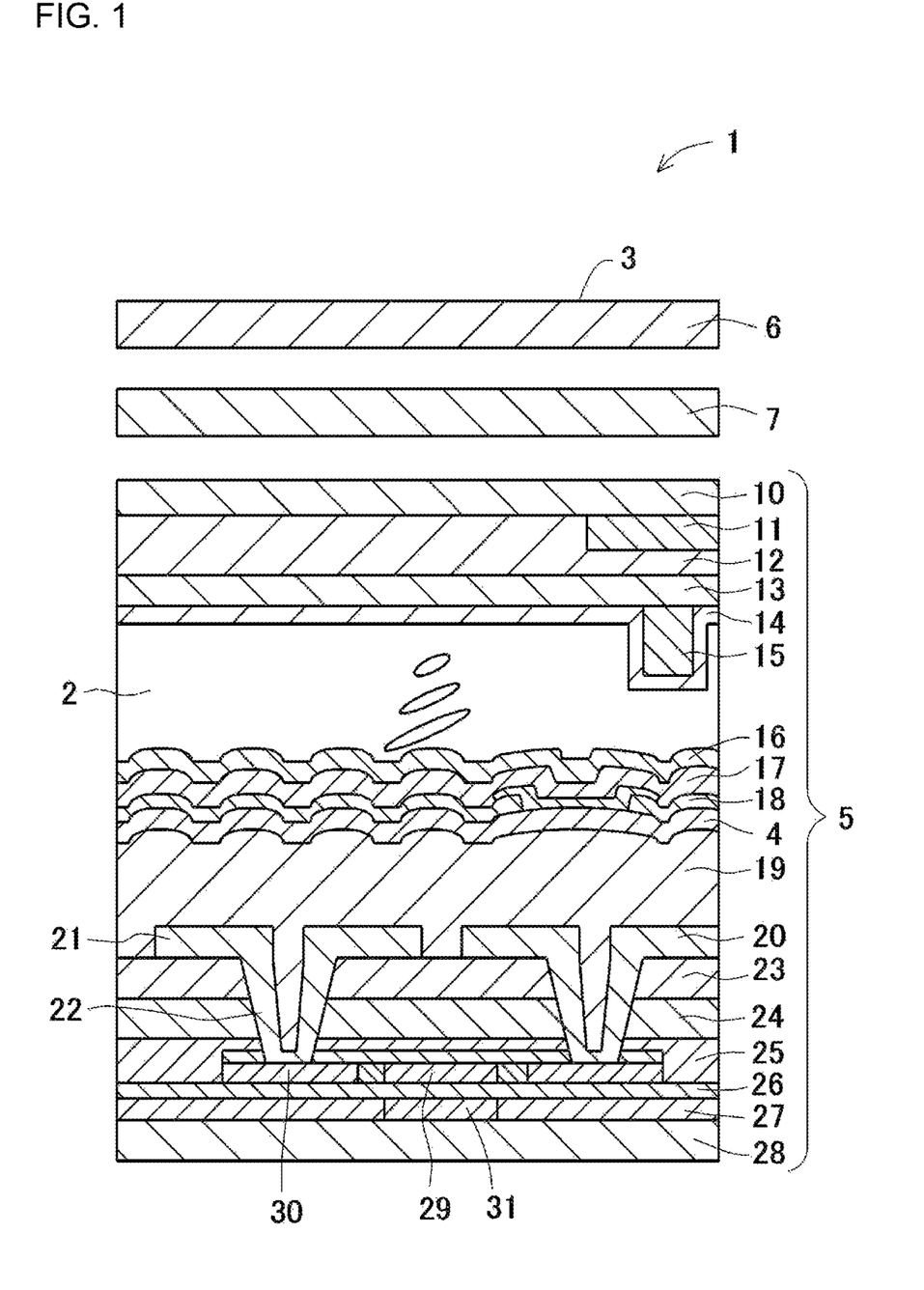
FIG. 1 is a cross-sectional view of a liquid crystal display (LCD) device according to an embodiment of the present disclosure.
Figure 2:
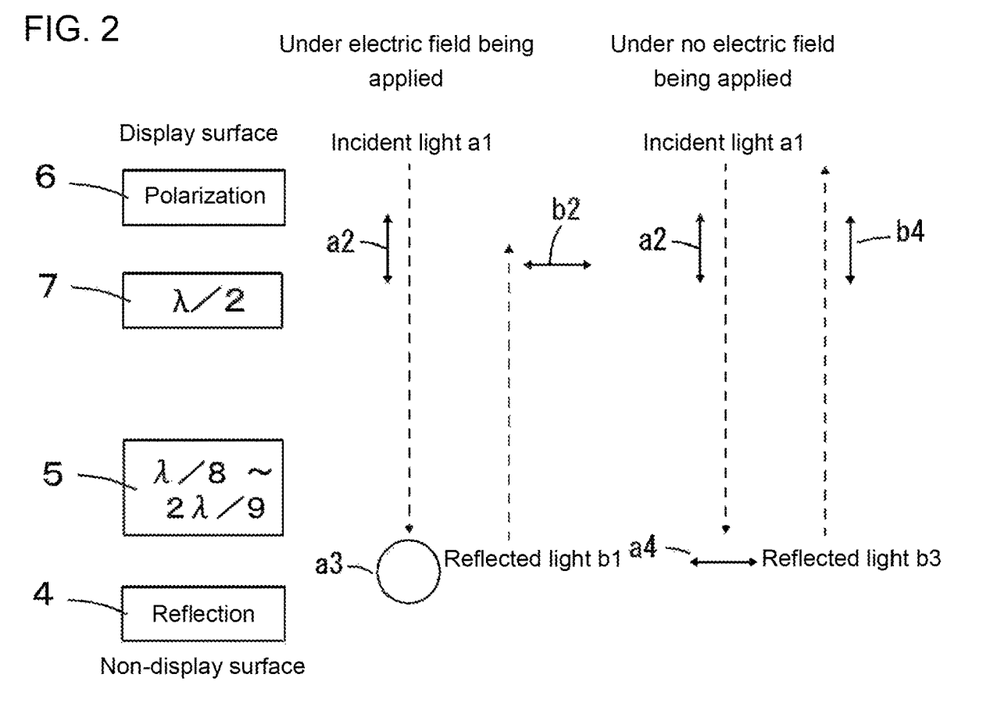
FIG. 2 is a diagram describing the operation of the LCD device under an electric field being applied and under no electric field being applied.
Figure 3:
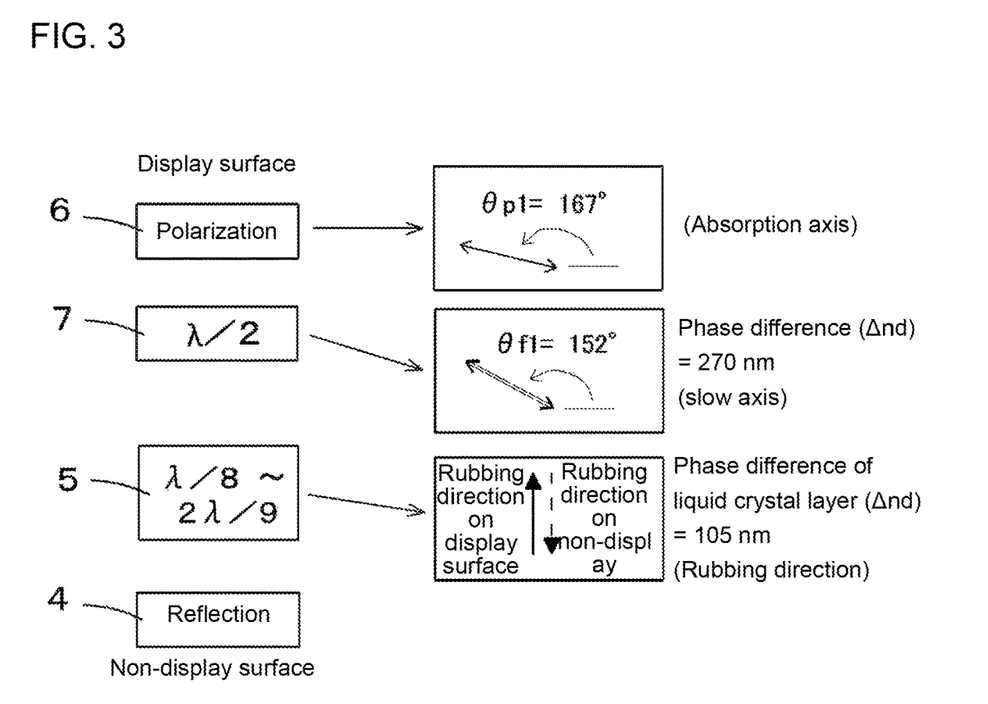
FIG. 3 is a diagram describing axis positions and phase differences of the LCD device.

FIG. 1 is a cross-sectional view of a liquid crystal display (LCD) device according to an embodiment of the present disclosure. FIG. 2 is a diagram describing the operation of the LCD device under an electric field being applied and under no electric field being applied. FIG. 3 is a diagram describing axis positions and phase differences of the LCD device.

An LCD device with the structure that forms the basis of the LCD device according to one or more embodiments of the present disclosure is an electrically controlled birefringence (ECB) LCD device including a polarizing plate, a liquid crystal layer, a mirror, and a half-wavelength plate between the polarizing plate and the liquid crystal layer, with the liquid crystal layer having a quarter wavelength as its phase difference Δnd. The LCD device is thus a reflective liquid crystal element for a normally black display with high luminance and high contrast. However, no literature including Patent Literature 1 describes a technique for performing a normally black display in both a reflective portion and a transmissive portion or for improving the black level through wavelength dispersion with a birefringence index Δn of a liquid crystal layer.

The ECB LCD device is driven in the operation mode described below. Under no electric field being applied to the liquid crystal layer (in the initial orientation), the liquid crystal molecules are parallel to the surface of the substrate. Under a gradually increasing electric field being applied to the liquid crystal layer and once the applied electric field exceeds a threshold electric field, the molecules start gradually being oriented toward being perpendicular to the substrate surface, and then are perpendicular to the substrate surface at a high voltage.

One or more embodiments of the present invention will now be described in detail with reference to the drawings.

An LCD device 1 according to the present embodiment is a reflective ECB LCD device that performs a normally black display. The LCD device 1 includes an LCD panel 5 including a liquid crystal layer 2, a light reflective layer 4 that reflects light incident through a display surface 3 and passing through the liquid crystal layer 2, a first polarizing plate 6 adjacent to the display surface 3 of the LCD panel 5, and a half-wavelength plate 7 between the LCD panel 5 and the first polarizing plate 6. The half-wavelength plate 7 has its phase difference Δnd indicating a positively dispersive wavelength.

The liquid crystal layer 2 has the phase difference Δnd (hereafter also as Δnd−1) less than a half of the phase difference Δnd of the half-wavelength plate 7 (hereafter also as Δnd−2), and a slow axis intersecting with an orientation axis of the liquid crystal molecules under no electric field being applied. The liquid crystal layer 2 has the birefringence index Δn indicating a positively dispersive wavelength.

The LCD panel 5 includes a first substrate 10, a light shield layer 11, a color filter layer 12, a common electrode 13, a first orientation layer 14, a pillar 15, the liquid crystal layer 2, a second orientation layer 16, a transparent electrode 17, a fifth interlayer insulation 18, the light reflective layer 4, a fourth interlayer insulation 19, a drain electrode 20, a source electrode 21, an interlayer connector 22, a third interlayer insulation 23, a second interlayer insulation 24, a first interlayer insulation 25, a second gate insulation 26, a first gate insulation 27, a second substrate 28, a channel 29, a semiconductor layer 30, and a gate electrode 31.

The drain electrode 20, the source electrode 21, the interlayer connector 22, the channel 29, the semiconductor layer 30, and the gate electrode 31 are included in a thin film transistor (TFT) as an active element. The drain electrode 20 is connected to the light reflective layer 4 as a pixel electrode with the interlayer connector 22 or another connector. The gate electrode 31 has gate signal lines connected to the electrode for the respective pixel rows. The source electrode 21 has source signal lines connected to the electrode for the respective pixel columns. The gate signal lines and the source signal lines cross each other to define pixels at the intersections.

The first substrate 10 and the second substrate 28 are glass substrates. The light shield layer 11 serves as a black matrix between pixels in a plan view or as the structure in FIG. 1 is viewed from above. The light shield layer 11 defines pixels. The common electrode 13 serves as a transparent electrode layer and is formed from, for example, indium tin oxide (ITO). The first orientation layer 14 and the second orientation layer 16 are formed from, for example, polyimide. The fourth interlayer insulation 19 is formed from, for example, an acrylic resin. The first, the second and the third interlayer insulations 25, 24, and 23, as well as the first and the second gate insulations 26 and 27 are formed from silicon monoxide (SiO) or silicon nitride (SiN). The light reflective layer 4 is formed from, for example, molybdenum (Mo) or aluminum (Al). The light reflective layer 4 includes, for example, an Al layer stacked on a Mo layer.

The TFT includes a semiconductor layer 30 formed from, for example, amorphous silicon (a-Si) or low-temperature polycrystalline silicon (LTPS). The TFT can be a three-terminal element having the gate electrode 31, the source electrode 21, and the drain electrode 20, and can be a switching element (a gate transfer element) for feeding a current to the semiconductor layer 30 (channel) between the source electrode 21 and the drain electrode 20 by applying a voltage with a predetermined potential (e.g., 3 or 6 V) to the gate electrode 31.

The first polarizing plate 6 is a linear polarizing plate that selectively transmits linearly polarized light aligned with a light transmission axis (hereafter also as a transmission axis) from randomly polarized light (elliptically polarized light) that is incident from outside through the display surface 3. The first polarizing plate 6 has the light transmission axis (or a light absorption axis, hereafter also as an absorption axis) that may intersect at an angle other than 90° with a light transmission axis (or a light absorption axis) of the second polarizing plate 44 described later (refer to FIG. 6). This intersection angle in the present embodiment may be set in the range of 85 to 130°, or may specifically be set at 121°. The specified range of the intersection angle enables a normally black display to be performed with a high quality black level.

The LCD panel 5 is an ECB panel and undergoes horizontal orientation processing that orients the liquid crystal molecules parallel to the facing surfaces of the first and the second substrate 10 and 28 when the liquid crystal layer 2 is in the initial orientation under no electric field being applied. When a gradually increased electric voltage is applied to the LCD panel 5 and exceeds a threshold voltage, the liquid crystal molecules start gradually being oriented toward being perpendicular to the surfaces of the first substrate 10 and the second substrate 28, and then are perpendicular to the surfaces of the substrate 10 and the substrate 28 at a voltage higher than a specified value.

A liquid crystal is a refractive index anisotropy medium, with a light wave in the direction of the orientation axis (X-axis) of the liquid crystal molecules and a light wave in the direction orthogonal to the orientation axis (Y-axis) of the liquid crystal molecules traveling at different speeds. In other words, the light waves traveling along X-axis and Y-axis have different refractive indexes. The difference between the refractive index along X-axis (nx) and the refractive index along Y-axis (ny) is referred to as a birefringence index $\Delta n$ (=nx−ny).

Light waves incident on and emitted from the liquid crystal layer 2 travel at different speeds along X-axis and Y-axis, producing a phase shift between X-axis and Y-axis. This phase shift is referred to as a phase difference $\Delta nd$ or retardation. The phase difference $\Delta nd=\delta$ is written as Formula 1 below:

$$\delta = 2\pi \cdot \Delta n \cdot d / \lambda \qquad (1)$$

where $\lambda$ is the wavelength of incident light, d is the thickness of the liquid crystal layer 2, and $\Delta n$ is the birefringence index. The phase difference is also written as $\Delta n \cdot d$ (nm).

The inventor has noticed that the normally black ECB LCD device 1 can have appropriate tones (black level) of the normally black display (close to true black) when the phase difference $\Delta nd$−1 of the liquid crystal layer 2 is less than one half of the phase difference $\Delta nd$−2 of the half-wavelength plate 7 (the half-wavelength plate 7 has, at the wavelength of 550 nm for example, the phase difference $\Delta nd$−2 of about 275 nm, or specifically 270 nm in the present embodiment). The inventor has also noticed that the tones of the normally black display can be improved by placing the half-wavelength plate 7 added to the LCD panel 5 to have the slow axis in a predetermined direction.

The inventor has further noticed that the black level and the white level can be improved and have high display quality by allowing the half-wavelength plate 7 to have the phase difference $\Delta nd$−2 indicating a positively dispersive wavelength and the liquid crystal layer 2 to have the birefringence index $\Delta n$ indicating a positively wavelength dispersion, and more specifically, by allowing the half-wavelength plate 7 to have the phase difference $\Delta nd$−2 indicating the wavelength dispersion less than that of the birefringence index $\Delta n$ of the liquid crystal layer 2. When the phase difference $\Delta nd$−2 of the half-wavelength plate 7 is 436 nm at the wavelength $\lambda$ of 436 nm, and the phase difference $\Delta nd$−2 of the half-wavelength plate 7 is 589 nm at the wavelength $\lambda$ of 589 nm, the wavelength dispersion of the phase difference $\Delta nd$−2 is $\Delta n$ (436 nm)/$\Delta n$ (589 nm), with the resultant phase difference greater than 1.00 indicating a positively dispersive wavelength. In other words, the half-wavelength plate 7 has a positively dispersive wavelength when the phase difference $\Delta nd$−2 at a short wavelength is greater than the phase difference $\Delta nd$−2 at a long wavelength. When the birefringence index $\Delta n$ of the liquid crystal layer 2 is $\Delta n$ (436 nm) at the wavelength $\lambda$ of 436 nm, and the birefringence index $\Delta n$ of the liquid crystal layer 2 is $\Delta n$ (589 nm) at the wavelength $\lambda$ of 589 nm, the wavelength dispersion of the birefringence index $\Delta n$ is $\Delta n$ (436 nm)/$\Delta n$ (589 nm), with the resultant phase difference greater than 1.00 indicating a positively dispersive wavelength. More specifically, the half-wavelength plate 7 has a positively dispersive wavelength when the birefringence index Δn at a short wavelength is greater than the birefringence index Δn at a long wavelength.

Wavelength dispersion is the wavelength dependency of the refractive index of light traveling through a material. The refractive index of light in a material changes depending on its wavelength. Thus, the polarization state of light changes when passing through the liquid crystal layer and the plate with the phase difference Δnd, which are refractive index anisotropy media. The wavelength dispersion of light in a liquid crystal changes depending on the structure and functional groups of the liquid crystal. For the physical properties of a liquid crystal, the wavelength dispersion of light changes depending on the nematic-isotropic phase transition temperature (Tni), the birefringence index Δn, and the dielectric anisotropy Δε that determines the drive voltage. The wavelength dispersion of a liquid crystal increases as the transition temperature Tni is higher and the values Δn and Δε are greater. For mobile applications to consume less power using low-voltage driving, the transition temperature Tni may be 75 to 105° C., the value Δn may be 0.050 to 0.080, and the value Δε may be +8 to +18. This settings can lower power consumption using low-voltage driving with 2.4 to 3.6 V. A range of values referred to herein as one value to another value intends to mean the two values being inclusive.

The inventor has prepared LCD device samples in example 1 and comparative example 1 to determine improved viewability in a normally black display. The samples each include the liquid crystal layer 2 with the phase difference Δnd–1 of 105 nm and the first polarizing plate 6 being the polarizing plate TEG1465DUHC (Nitto Denko Corporation). Each sample uses the half-wavelength plate 7 being ZeonorFilm (Zeon Corporation) with the phase difference Δnd–2 of 270 nm. The half-wavelength plate 7 has the phase difference Δnd–2 indicating a positively dispersive wavelength of 1.020 from Δnd–2 (436 nm)/Δnd–2 (589 nm). This results from the phase difference Δnd–2 (436 nm) of 274 nm and the phase difference Δnd–2 (589 nm) of 268.5 nm. The LCD device in example 1 includes the liquid crystal layer 2 with the transition temperature Tni of 85° C. and the value Δε of +11.4, for which the birefringence index Δn indicates a positively dispersive wavelength from Δn (436 nm)/Δn (589 nm) of 1.063. This results from the value Δn (436 nm) of 0.0727 and the value Δn (589 nm) of 0.0684. The thickness d of the liquid crystal layer 2 is 1.54 μm. The phase difference Δnd–1 of the liquid crystal layer 2 is 105 nm. The LCD device in comparative example 1 includes the liquid crystal layer 2 with the transition temperature Tni of 95° C., the value Δε of +7.0, and the birefringence index Δn indicating a positively dispersive wavelength of 1.078 from Δn (436 nm)/Δn (589 nm). This results from the value Δn (436 nm) of 0.0970 and the value Δn (589 nm) of 0.0900. The thickness d of the liquid crystal layer 2 is 1.17 μm. The phase difference Δnd–1 of the liquid crystal layer 2 is 105 nm. For each sample, the reflectance and the reflected colors (x, y) (where x and y indicate the color levels) of a black display, as well as the reflectance and the reflected colors (x, y) and the reflection contrast ratio of a white display, were measured using the spectrophotometer CM-2600d (Konica Minolta, Inc.).

The results in example 1 for a black display show the reflectance of 0.51% (with an applied voltage of 0 V), the reflected color x of 0.300, and the reflected color y of 0.290. The results in example 1 for a white display show the reflectance of 17.3% (with an applied voltage of 3 V), the reflected color x of 0.305, the reflected color y of 0.335, and the reflection contrast ratio of 34:1. In contrast, the results in comparative example 1 for a black display show the reflectance of 0.63% (with an applied voltage of 0 V), the reflected color x of 0.240, and the reflected color y of 0.220. The results in comparative example 1 for a white display show the reflectance of 17.6% (with an applied voltage of 4 V), the reflected color of x of 0.310, the reflected color y of 0.350 (with an applied voltage of 4 V), and the reflection contrast ratio of 28:1. In comparison with the LCD device in example 1, the LCD device in comparative example 1 shows the reflected colors for a black display shifted toward blue colors, the reflected colors for a white display shifted toward yellow-green colors, and a slightly lower reflection contrast ratio.

The LCD device with the liquid crystal layer 2 having the phase difference Δnd–1 less than a half of the phase difference Δnd–2 of the half-wavelength plate 7 has higher viewability for a black display, showing improved black level quality. For the LCD device with the liquid crystal layer 2 having the phase difference Δnd–1 less than one quarter of the phase difference Δnd–2 of the half-wavelength plate 7, the liquid crystal layer 2 has the phase difference Δnd–1 of 65 nm, the reflection contrast ratio of 8:1, and the tendency of lower viewability of a black display. The phase difference Δnd–1 of the liquid crystal layer 2 may be a quarter to a half, or more specifically a quarter to four-ninths, of the phase difference Δnd–2 of the half-wavelength plate 7.

The liquid crystal layer 2 has the phase difference Δnd–1 substantially serving as the quarter-wavelength plate. Circularly polarized light emitted from the half-wavelength plate 7 and the liquid crystal layer 2 becomes wide-band circularly polarized light. However, when the circularly polarized light emitted from the liquid crystal layer 2 is reflected off the light reflective layer 4, its rotational direction is reversed.

Referring to FIGS. 2 and 3, when the LCD panel 5 is viewed from the display surface 3 or when the direction orthogonal to the initial orientation (rubbing direction) of the liquid crystal molecules under no electric field being applied is the reference axis(0°) and the counterclockwise angle from the reference axis to each axis is the angle of an axis such as the slow axis, the absorption axis angle θp1 of the first polarizing plate 6 is, for example, 167°. The half-wavelength plate 7 has the slow axis angle θf1 of 152° with the phase difference Δnd–2 of 270 nm and the wavelength dispersion of 1.020, being Δnd–2 (436 nm)/Δnd–2 (589 nm).

When the half-wavelength plate 7 with the phase difference Δnd–2 being Δnd–2 (436 nm)/Δnd–2 (589 nm) and the liquid crystal layer 2 with the birefringence index Δn being Δn (436 nm)/Δn (589 nm) each indicate a positively dispersive wavelength, and when the half-wavelength plate 7 with the wavelength dispersion of the phase difference Δnd–2 less than that of the birefringence index Δn of the liquid crystal layer 2, the black level and the white level are improved and have higher display quality. More specifically, a first deviation of the wavelength dispersion from 1 (difference from 1) at the birefringence index Δn of the liquid crystal layer 2 may be about three times or less than a second deviation of the wavelength dispersion from 1 (difference from 1) at the phase difference Δnd–2 of the half-wavelength plate 7. For example, the wavelength dispersion at the birefringence index Δn of the liquid crystal layer 2 may be about 1.060 (1.064 at maximum) or less when the wavelength dispersion at the phase difference Δnd–2 of the half-wavelength plate 7 is 1.020. Thus, the deviations may be $\delta 2 < \delta 1 \leq 3 \times \delta 2$, where $\delta 1$ is the first deviation of the wavelength dispersion from 1 at the birefringence index Δn of the liquid crystal layer 2 (Δnd−1=1+δ1), and δ2 is the second deviation of the wavelength dispersion from 1 at the phase difference Δnd−2 of the half-wavelength plate 7 (Δnd−2=1+δ2). When δ1 exceeds 3δ2(3×δ2<δ1), the reflected colors for a black display shift toward blue colors and the reflected colors for a white display shift toward yellow-green colors. The reflection contrast ratio tends to decrease. For mobile applications, the transition temperature Tni may be 75 to 105° C., the value Δn may be 0.050 to 0.080, and the value Δ£ may be +8 to +18 to consume less power using low-voltage driving with 2.4 to 3.6 V.

The slow axis of the half-wavelength plate 7 and the orientation axis of the liquid crystal molecules under no electric field being applied intersect at an angle α1. The intersection angle α1 between the slow axis of the half-wavelength plate 7 and the orientation axis of the liquid crystal molecules under no electric field being applied is specifically set at 52 to 72°, more specifically at 62°. This enables a black display with high-quality black level and improves the tones (black level) of a normally black display.

The display with the LCD device 1 will now be described with reference to FIG. 2. Randomly polarized light a1 (elliptically polarized light) incident from outside through the display surface 3 of the LCD device 1 is converted to linearly polarized light (linearly polarized light a2) through the first polarizing plate 6. The linearly polarized light a2 is then converted to wide-band circularly polarized light (circularly polarized light a3) through the half-wavelength plate 7 and the liquid crystal layer 2.

The liquid crystal layer 2 has the phase difference Δnd−1 of 0 under an electric field applied to the liquid crystal layer 2. The light then passes through the half-wavelength plate 7 and the liquid crystal layer 2 to become linearly polarized light a4, which is then reflected off the light reflective layer 4. The reflected light b3 of the linearly polarized light a4 passes through the liquid crystal layer 2 and the half-wavelength plate 7 again to become linearly polarized light b4 in the same polarization direction as the first polarizing plate 6 for a white display.

Under no electric field being applied to the liquid crystal layer 2, light passes through the liquid crystal layer 2 and becomes wide-band circularly polarized light a3 that is reflected off the light reflective layer 4 and then becomes reflected light b1. The reflected light b1 of the circularly polarized light passes through the liquid crystal layer 2 and the half-wavelength plate 7 again to become linearly polarized light b2 that intersects orthogonally to the polarization direction of the first polarizing plate 6. This enables a black display with high-quality black level for a normally black display and reduces black level degradation.

Figure 4:
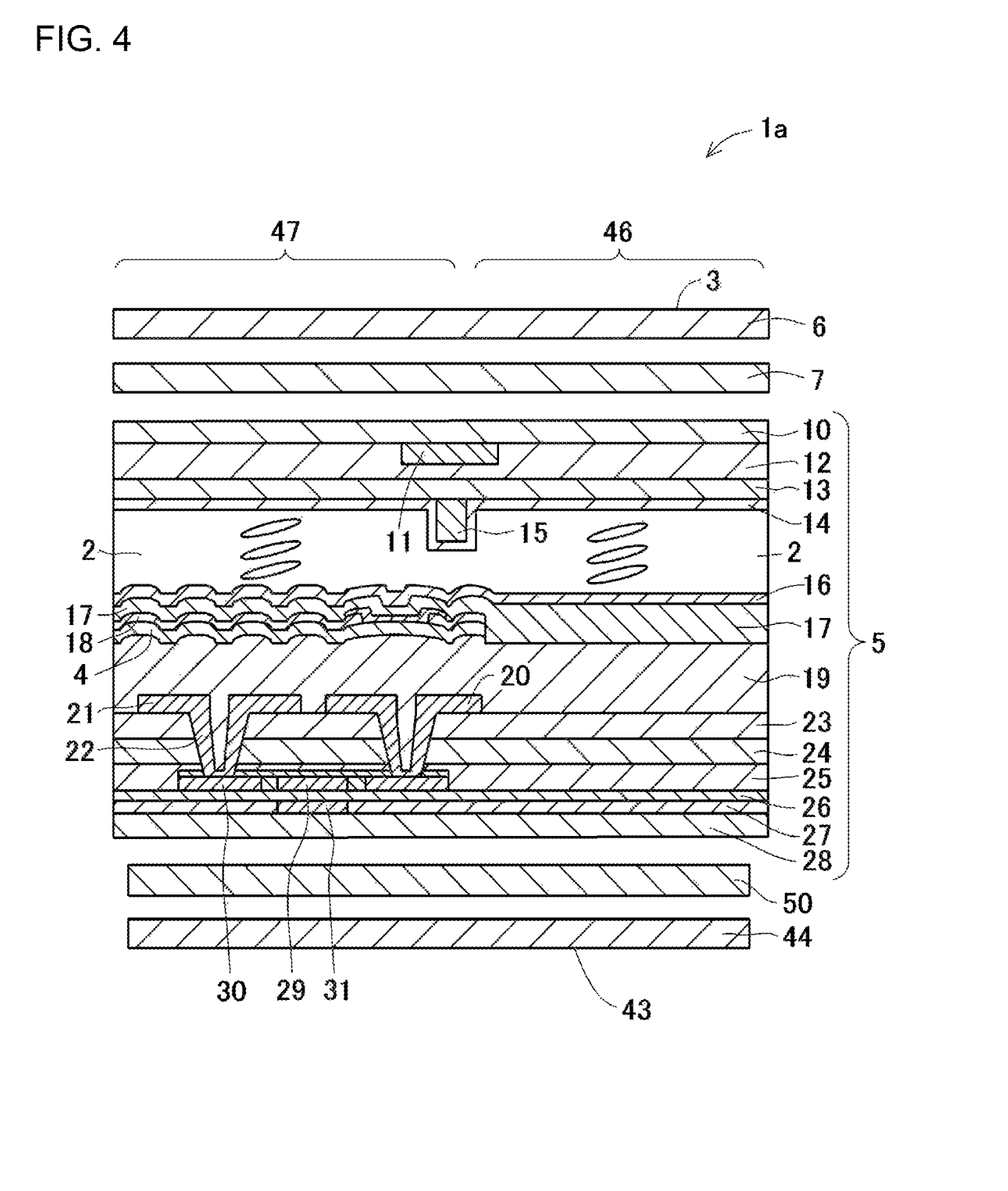
FIG. 4 is a cross-sectional view of an LCD device according to another embodiment of the present disclosure.
Figure 5:
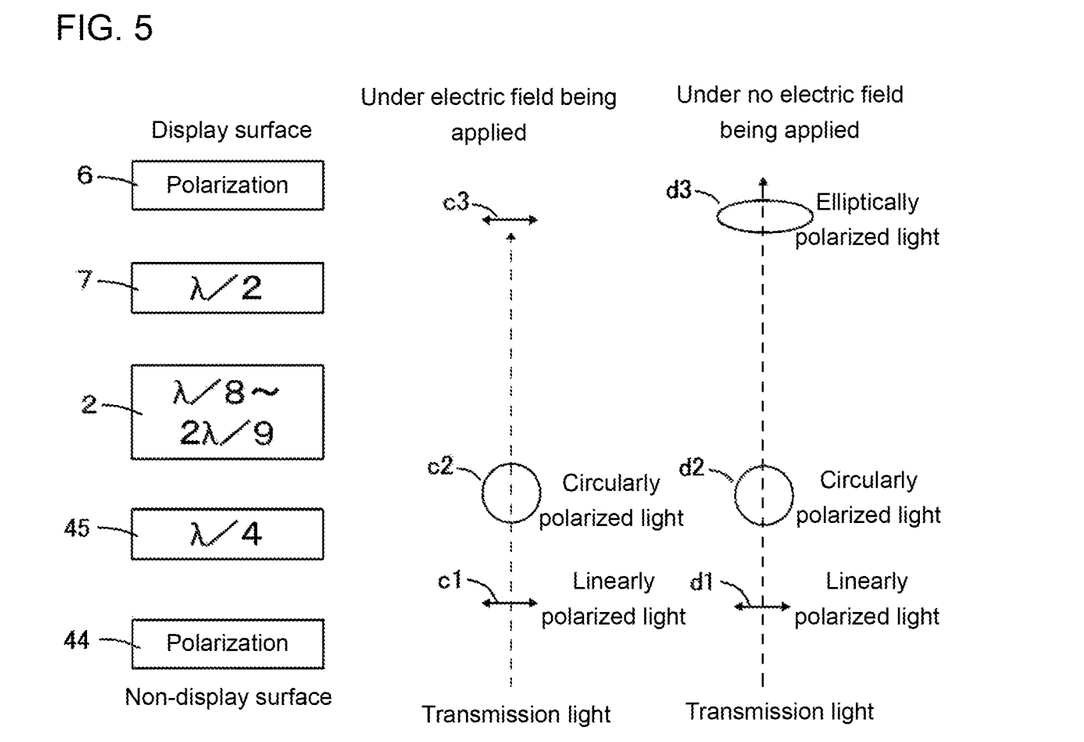
FIG. 5 is a diagram describing the operation of the LCD device according to the other embodiment under an electric field being applied and under no electric field being applied.
Figure 6:
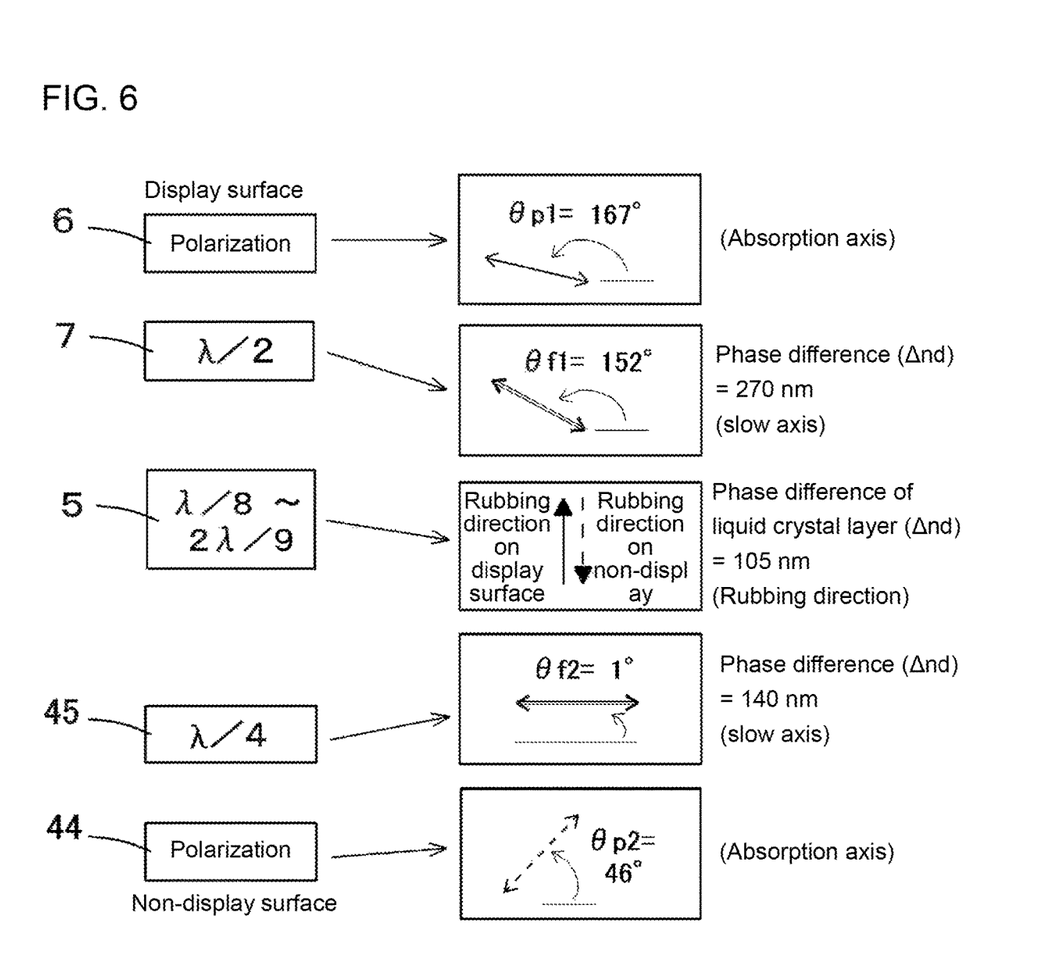
FIG. 6 is a diagram describing axis positions and phase differences of the LCD device according to the other embodiment.

FIG. 4 is a cross-sectional view of the LCD device according to another embodiment of the present disclosure. FIG. 5 is a diagram describing the operation of the LCD device according to the other embodiment under an electric field being applied and under no electric field being applied. FIG. 6 is a diagram describing axis positions and phase differences of the LCD device according to the other embodiment. The same reference signs denote the components corresponding to those in the above embodiment and will not be described repeatedly.

An LCD device 1a according to the present embodiment includes a second polarizing plate 44 on a non-display surface 43 on an LCD panel 5, a quarter-wavelength plate 50 between the LCD panel 5 and the second polarizing plate 44, and a transmissive portion 46 including a liquid crystal layer 2 to transmit light incident through a non-display surface 43 of the LCD panel 5. The LCD device 1a is a semi-transmissive LCD including both the reflective portion and the transmissive portion. The non-display surface 43 basically includes no backlight but may have a backlight.

At least a portion of the non-display surface 43 overlapping the reflective portion 47 may does not have a backlight. In this structure, a backlight may be placed on a portion of the non-display surface 43 overlapping the transmissive portion 46 to improve contrast in a transmission light display mode. This enables display images on the LCD device to be viewable in the transmission light display mode in low illumination environments such as at night. A smaller backlight can be used. Thus, the LCD device can be compact and lightweight to consume less power. As described above, the LCD device may include no backlight.

The quarter-wavelength plate 50 has its slow axis intersecting almost orthogonally to the orientation axis of the liquid crystal molecules under no electric field being applied and thus can cancel the phase difference Δnd (hereafter also as Δnd−3). The quarter-wavelength plate 50 may then be located between the LCD panel 5 and the second polarizing plate 44.

Under no electrical field being applied to the liquid crystal layer 2, incident light through the non-display surface 43 of the LCD panel 5 becomes linearly polarized light c1 through the second polarizing plate 44. The linearly polarized light c1 becomes circularly polarized light c2 after passing through the quarter-wavelength plate 50. The circularly polarized light c2 becomes linearly polarized light c3 after passing through the liquid crystal layer 2 and the half-wavelength plate 7. The polarization direction of the linearly polarized light c3 is orthogonal to the polarization direction of the first polarizing plate 6. Thus, the linearly polarized light c3 is not emitted outside from the first polarizing plate 6. This enables the semi-transmissive LCD device 1a to perform a black display with high-quality black level of a normally black display.

Under an electric field being applied to the liquid crystal layer 2, incident light through the non-display surface 43 passes through the second polarizing plate 44 and becomes linearly polarized light d1. The linearly polarized light d1 becomes circularly polarized light d2 through the quarter-wavelength plate 50. The circularly polarized light d2 passes through the liquid crystal layer 2 and the half-wavelength plate 7 and becomes elliptically polarized light d3. The elliptically polarized light d3 with the same polarization direction as the first polarizing plate 6 selectively passes for a white display.

Referring to FIGS. 5 and 6, when the LCD panel 5 is viewed from the display surface 3 or when the direction orthogonal to the initial orientation (rubbing direction) of the liquid crystal molecules under no electric field being applied is the reference axis(0°) and the counterclockwise angle from the reference axis to each axis is the angle of an axis such as the slow axis, the absorption axis angle θp1 of the first polarizing plate 6 is 167°. The half-wavelength plate 7 has the slow axis angle θf1 of 152° with the phase difference Δnd−2 of 270 nm and the wavelength dispersion of 1.020, from Δnd−2 (436 nm)/Δnd−2 (589 nm). The quarter-wavelength plate 50 has the slow axis angle θf2 of 1° with the phase difference Δnd−3 of 140 nm and the wavelength dispersion of 1.022 from Δnd−3 (436 nm)/Δnd−3 (589 nm). The absorption axis angle θp2 of the second polarizing plate 44 is 46°. The quarter-wavelength plate 50 is ZeonoFilm (Zeon Corporation). The second polarizing plate 44 is TEG1465DUHC (Nitto Denko Corporation).

The intersection angle between the slow axis of the half-wavelength plate 7 and the orientation axis of the liquid crystal molecules under no electric field being applied may be selected from 52 to 72°, or may be selected as 62°. The intersection angle between the orientation axis of the liquid crystal molecules under no electric field being applied and the slow axis of the quarter-wavelength plate 50 is selected as 91°. Further, the intersection angle between the absorption axis of the first polarizing plate 6 and the absorption axis of the second polarizing plate 44 (θp1−θp2) may be selected from 85 to 130°, or may be selected as 121°. This enables a black display with high-quality black level of a normally black display.

The phase difference Δnd of the transmissive portion 46 (hereafter also as Δnd−4) can be set greater than the phase difference Δnd of the reflective portion 47 (hereafter also as Δnd−5), or Δnd−4>Δnd−5. A multi-gap structure can be used for the transmissive portion 46 and the reflective portion 47 on the liquid crystal layer 2. In other words, a thickness adjustment layer may be used for adjusting the thickness of the liquid crystal layer 2. Thus, both a reflective display and a transmissive display can be performed with high contrast.

As shown in FIG. 4, the reflective portion 47 may include the light shield layer 11 with the pillar 15 overlapping the light shield layer 11 at an end adjacent to the transmissive portion 46 in a plan view. This structure reduces light from another portion entering between the reflective portion 47 and the transmissive portion 46. More specifically, this structure can reduce unintended light entering through the transmissive portion 46 into the reflective portion 47 in the reflective mode for driving the reflective portion 47. This enables a black display with higher-quality black level of a normally black display in the reflective mode. This structure can also reduce unintended light entering through the reflective portion 47 into the transmissive portion 46 in the transmissive mode for driving the transmissive portion 46 in the transmissive mode. This enables a black display with higher-quality black level of a normally black display in the transmissive mode.

The light shield layer 11 with the pillar 15 overlapping the light shield layer 11 may be located at an end adjacent to the reflective portion 47 in the transmissive portion 46, or at the boundary between the reflective portion 47 and the transmissive portion 46 in a plan view.

The surface of the reflective portion 47 facing the liquid crystal layer 2 may be rougher than the surface of the transmissive portion 46 facing the liquid crystal layer 2. The roughness causes scattering of light incident through the surface of the reflective portion 47 facing the liquid crystal layer 2, thus reducing mirror reflection. This reduces reflection of the faces or the backgrounds of viewers on the display when, for example, viewers view the display of the LCD device with images being displayed in the reflective mode. Also, the transmissivity of the images displayed in the transmissive mode can improve with less light scattering on the transmissive portion 46, thus improving the contrast ratio.

When the surface roughness (arithmetic average roughness) is 55 nm or less, which is 1/10 or less of light with the wavelength of 550 nm to which the human eyes are most sensitive, the rough surface is close to an optical mirror surface. Thus, the surface of the transmissive portion 46 facing the liquid crystal layer 2 may have a roughness about 1 to 55 nm. The surface of the reflective portion 47 facing the liquid crystal layer 2 may have a roughness of about 55 to 100 nm, or about 55 to 70 nm.

A portable device according to one or more embodiments of the present disclosure includes a contrast ratio controller that raises the contrast ratio of an image displayable by the LCD device exposed to outside light to be higher than that of an image displayable by the LCD device unexposed to outside light. This allows the display on the LCD device to be more easily viewable in outdoor use. For example, images on the display of the LCD device included in digital display wrist watches, smart watches, cameras with an LCD, or other devices may be less easily viewable outdoors under outside light with high illuminance. The portable device according to one or more embodiments of the present disclosure includes the LCD device according to one or more embodiments of the present disclosure free of this issue and can display images with a high contrast ratio, thus reducing the likelihood of being less easily viewable under outside light with high illuminance. When the portable device according to one or more embodiments of the present disclosure is used in environments with low illumination such as indoors, the contrast of images displayed on the LCD device is lowered, thus reducing power consumption while maintaining the viewability to viewers.

The range may be 1<Cr1/Cr2≤2, or 1.1≤Cr1/Cr2≤1.5, wherein Cr1 is the contrast ratio of images displayed on the LCD device under outside light, and Cr2 is the contrast ratio of images displayed on the LCD device under no outside light. The ranges are not limited to these ranges.

Outside light incident on the LCD device may be detected using a photoelectric conversion element, such as a positive-intrinsic-negative (PIN) photodiode. Outside light includes sunlight in a clear weather and ambient light in a cloudy weather. Sunlight in a clear weather has an illuminance of 32,000 to 100,000 lux on a daily average, whereas outside light in a cloudy weather has an illuminance of about 10,000 lux. Light indoors with no outside light has an illuminance of about 1,000 lux.

The contrast ratio may be controlled to increase in a gradual or stepwise manner as the ambient illuminance around the LCD device increases. The control may be linear, with the illuminance and the contrast ratio being proportional to each other. The control may be nonlinear, with the illuminance increasing at a constant rate of change but the rate of change decreasing as the contrast ratio increases. For example, the contrast ratio CR may be controlled to respond to $(Ld)^a$ (0<a<1), where Ld is the illuminance. In this case, although the maximum width of the illuminance change (the difference between the minimum and the maximum) is large, the contrast ratio can be controlled to change finely and precisely in response to large changes in illuminance.

The contrast ratio controller may be a functional unit that controls the contrast ratio by controlling the voltage applied to the liquid crystal layer 2, and may be a drive included in an LCD device, such as an integrated circuit (IC) or a large-scale integration circuit (LSI). The contrast ratio controller may be a software program stored in a read-only memory (RAM), a random-access memory (ROM), or another storage in the drive. The contrast ratio controller may be included in a drive circuit, such as a gate signal line drive circuit or a source signal line drive circuit, included in the LCD device. The contrast ratio controller may be a drive or a drive circuit included in a drive circuit board external to the LCD device.

The LCD device according to one or more embodiments of the present disclosure can be an ECB LCD device that displays a normally black display, and includes the liquid crystal layer with the phase difference substantially serving as the quarter-wavelength plate. Circularly polarized light emitted from the half-wavelength plate and the liquid crystal layer becomes wide-band circularly polarized light.

Under an electric field being applied to the liquid crystal layer, light through the half-wavelength plate and the liquid crystal layer becomes linearly polarized light, and is reflected off the reflective portion. The reflected light of the linearly polarized light passes through the liquid crystal layer and the half-wavelength plate again to become linearly polarized light with the same polarization direction as the first polarizing plate for a white display.

Under no electric field being applied to the liquid crystal layer, the half-wavelength plate and the liquid crystal layer substantially serve as the quarter-wavelength plate, and circularly polarized light emitted from the liquid crystal layer becomes wide-band circularly polarized light that is reflected off the reflective portion to be reflected light. The reflected light of the circularly polarized light then passes through the liquid crystal layer and the half-wavelength plate again to become linearly polarized light that intersects orthogonally to the polarization direction of the first polarizing plate. This enables a black display with a broad band and high-quality black level of a normally black display and reduces black level degradation. Moreover, the phase difference of the liquid crystal layer is less than one half of the phase difference of the half-wavelength plate to further improve the tones (black level) of a normally black display. Also, when the phase difference of the half-wavelength plate indicates a positively dispersive wavelength and the birefringence index of the liquid crystal layer indicates a positively dispersive wavelength, the black level and the white level can have high display quality. In other words, the phase difference of the half-wavelength plate and the birefringence index of the liquid crystal layer are each set to indicate a positively dispersive wavelength, enabling high-quality display in a wide wavelength band.

The portable device according to one or more embodiments of the present disclosure includes the contrast ratio controller that raises the contrast ratio of images displayed on the LCD device under outside light to be higher than that of images displayed on the LCD device under outside light to enable images on the display of the LCD device to be more easily viewable in outdoor use. For example, images on the display of the LCD device included in digital display wrist watches, smart watches, cameras with an LCD, or other devices may be less easily viewable outdoors under outside light with high illuminance. The portable device according to one or more embodiments of the present disclosure includes the LCD device according to one or more embodiments of the present disclosure free of this issue and can display images with a high contrast ratio, thus reducing the likelihood of being less easily viewable under outside light with high illuminance. For the portable device according to one or more embodiments of the present disclosure used in an environment with low illumination such as indoors, the contrast ratio of images displayed on the LCD device is lowered, thus reducing power consumption while maintaining the viewability to viewers.

Examples of the portable device according to one or more embodiments of the present disclosure include smartphones, mobile phones, tablets, personal digital assistants (PDAs), video cameras, digital still cameras, electronic notebooks, digital books, electronic dictionaries, portable personal computers, portable gaming devices, product display tags, and price display tags. Examples of the portable device according to one or more embodiments of the present disclosure also include wearable devices including digital display watches such as smart watches, sports wrist bands or watches displaying data such as heart rates, steps, and running distance, medical wrist bands or watches displaying vital data such as blood pressure, heart rate, and body temperature, and portable global positioning system (GPS) devices attachable to humans, animals, and others to locate their locations using the GPS.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present disclosure.

REFERENCE SIGNS LIST 1, 1a liquid crystal device
2 liquid crystal layer
3 display surface
4 light reflective layer
5 liquid crystal panel
6 first polarizing plate
7 half-wavelength plate
10 first substrate
11 light shield layer
12 color filter layer
13 common electrode
14 first orientation layer
15 pillar
16 second orientation layer
17 transparent electrode
18 fifth interlayer insulation
19 fourth interlayer insulation
20 drain electrode
21 source electrode
22 interlayer connector
23 third interlayer insulation
24 second interlayer insulation
25 first interlayer insulation
26 second gate insulation
27 first gate insulation
28 second substrate
29 channel
30 semiconductor layer
31 gate electrode
43 non-display surface
44 second polarizing plate
46 transmissive portion
47 reflective portion
50 quarter-wavelength plate

The invention claimed is:

1. A liquid crystal display device that is an electrically controlled birefringence liquid crystal display device having a normally black display and is used for a portable device, the liquid crystal display device comprising:
   a liquid crystal display panel including a liquid crystal layer and a reflective layer, the reflective layer configured to reflect light that is incident through a display surface of the liquid crystal display panel and that passes through the liquid crystal layer;
   a thin film transistor located below the reflective layer and electrically connected to the reflective layer,
   a first polarizing plate on the display surface of the liquid crystal display panel; and
   a half-wavelength plate between the liquid crystal display panel and the first polarizing plate, wherein a phase difference of the liquid crystal layer is less than a half of a phase difference of the half-wavelength plate, and has a birefringence index indicating a positively dispersive wavelength,
the phase difference of the half-wavelength plate indicates a positively dispersive wavelength, and a slow axis of the half-wavelength plate intersects with an orientation axis of liquid crystal molecules in the liquid crystal layer under no electric field being applied,
an absorption axis angle of the first polarizing plate intersects with the orientation axis of liquid crystal molecules in the liquid crystal layer under no electric field being applied,
a liquid crystal constituting the liquid crystal layer has a birefringence index of 0050 to 0.080 inclusive, and
a driving voltage of the liquid crystal is substantially equal to a gate voltage of the thin film transistor or is 2.4 V to 3.6 V which is lower than the gate voltage.

2. The liquid crystal display device according to claim 1, wherein
a wavelength dispersion of the phase difference of the half-wavelength plate is less than wavelength dispersion of the birefringence index of the liquid crystal layer.

3. The liquid crystal display device according to claim 2, wherein
the wavelength dispersion of the birefringence index of the liquid crystal layer has a first deviation from 1, and the first deviation is less than or equal to three times a second deviation from 1 of the wavelength dispersion of the phase difference of the half-wavelength plate.

4. The liquid crystal display device according to claim 1, wherein
the phase difference of the liquid crystal layer is in a range from a quarter to four-ninths of the phase difference of the half-wavelength plate.

5. The liquid crystal display device according to claim 1, wherein
the slow axis of the half-wavelength plate and the orientation axis of the liquid crystal molecules under no electric field being applied intersect with each other at an angle of 52 to 72° inclusive.

6. The liquid crystal display device according to claim 1, further comprising
a second polarizing plate on a non-display surface of the liquid crystal display panel, wherein
the first polarizing plate and the second polarizing plate are linear polarizing plates, and
a light transmission axis of the first polarizing plate and a light transmission axis of the second polarizing plate intersect with each other.

7. The liquid crystal display device according to claim 6, wherein
the light transmission axis of the first polarizing plate and the light transmission axis of the second polarizing plate intersect with each other at an angle of 85 to 130° inclusive.

8. The liquid crystal display device according to claim 1, wherein
a liquid crystal in the liquid crystal layer has a nematic-isotropic phase transition temperature of 75 to 105° C. inclusive.

9. The liquid crystal display device according to claim 1, wherein
a liquid crystal in the liquid crystal layer has a dielectric anisotropy of +8 to +18 inclusive.

10. The liquid crystal display device according to claim 1, wherein
the liquid crystal display panel includes a transmissive portion configured to allow light incident through a non-display surface of the liquid crystal display panel to pass through the liquid crystal layer,
the liquid crystal display device further comprises
a second polarizing plate on the non-display surface of the liquid crystal display panel, and
a quarter-wavelength plate between the liquid crystal display panel and the second polarizing plate, and
a slow axis of the quarter-wavelength plate and the orientation axis of the liquid crystal molecules under no electric field being applied intersect with each other at an angle of substantially 90°.

11. The liquid crystal display device according to claim 10, wherein
a phase difference of the transmissive portion is greater than a phase difference of the reflective portion.

12. The liquid crystal display device according to claim 1, wherein
the liquid crystal display panel includes a transmissive portion, and
a surface of the reflective portion facing the liquid crystal layer is rougher than a surface of the transmissive portion facing the liquid crystal layer.

13. The liquid crystal display device according to claim 1, wherein
at least a portion of a non-display surface of the liquid crystal display panel overlapping the reflective portion does not have a backlight.

14. A portable device, comprising:
the liquid crystal display device according to claim 1; and
a contrast ratio controller configured to raise a contrast ratio of an image displayable by the liquid crystal display device exposed to outside light to be higher than a contrast ratio of an image displayable by the liquid crystal display device unexposed to outside light.

15. The portable device according to claim 14, wherein the contrast ratio controller makes a nonlinear control of decreasing a rate of change that increases the contrast ratio relative to a constant rate of change when an ambient illuminance is high.

* * * * *